(12) United States Patent
Hayball (10) Patent No.: US 7,565,407 B1
(45) Date of Patent: Jul. 21, 2009

(54) NETWORK PROXY APPARATUS AND METHODS

(75) Inventor: Clive C. Hayball, Sawbridgeworth (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1242 days.

(21) Appl. No.: 09/747,698

(22) Filed: Dec. 22, 2000

(51) Int. Cl.
*G06F 15/16* (2006.01)
*G06F 15/173* (2006.01)

(52) U.S. Cl. .............. 709/216; 709/217; 709/218; 709/200; 709/220; 709/226

(58) Field of Classification Search ............ 707/1, 707/11; 705/14; 709/200, 216, 217, 218
See application file for complete search history.

(56) References Cited

U.S. PATENT DOCUMENTS

| | | | | |
|---|---|---|---|---|
| 5,557,748 A | * | 9/1996 | Norris | 709/220 |
| 6,205,146 B1 | * | 3/2001 | Rochberger et al. | 370/395.53 |
| 2004/0049598 A1 | * | 3/2004 | Tucker et al. | 709/246 |
| 2005/0193114 A1 | * | 9/2005 | Colby et al. | 709/226 |

* cited by examiner

*Primary Examiner*—Ario Etienne
*Assistant Examiner*—Sahera Halim
(74) *Attorney, Agent, or Firm*—Barnes & Thornburg LLP (57) ABSTRACT

Content is frequently replicated across IP-based networks such as the Internet. Replicas are stored in caches throughout the network. However, to date there has been no mechanism to allow users not directly associated with the replicas to access replicas. Therefore although a copy of a content item may be stored geographically nearby, it may still be necessary to obtain the original content item from a server many thousands of miles away.

By recording the location of content items and producing a mapping of a content item to all known replicas, it is possible to produce an authoritative proxy associated with a particular domain which is able to provide a list of URLs of alternative replica copies of a requested content item. In this way, a content request proxy associated with a requester of a content item may choose the best location for retrieving the content item from a list which may include local caches not directly associated with the requester.

8 Claims, 6 Drawing Sheets

NETWORK PROXY APPARATUS AND METHODS

FIELD OF THE INVENTION

This invention relates to the recordal and use of information about replicas of content items in an Internet protocol-based network.

BACKGROUND OF THE INVENTION

Content items such as HTML files or data files are stored in an Internet protocol (IP) based network on servers. The content items may be addressed using a so-called universal resource locator (URL) of the form [access protocol]:// [server.domain]/[directory]/[file]. Thus for example a URL of the form http://a.yahoo.com/somecontent/skips.html points to a resource which is the file skips.html located in the "somecontent" directory of server 'a" in the domain yahoo.com. The access protocol to be used to obtain the content item is hypertext transfer protocol (HTTP).

It will be seen therefore that the URL mechanism is a combined address both for the server location and the location of the file on that server. Additionally the URL identifies the access protocol. It has been found that forcing these information items into one single identifier such as a URL is not always an optimum solution. Therefore there are alternative mechanisms being considered such as the "handle' mechanism, The techniques described below operate equally well with traditional URL based accesses and handle-type mechanisms which separate content identification and content addressing/location.

It is the nature of IP based networks such as the Internet, Intranets or Extranets that content items are cached at various locations on the network. The caching may for example be in a dedicated cache server located in the core network. The purpose of the caching is to reduce the number of file accesses to the original location of the file thereby to reduce traffic on the network and increase access speeds. However, a locally cached version of a content item, is often available only to a small group of users because the existence of the local replica is not widely advertised. Thus although there may be many copies of the same content item distributed across the network, these copies or replicas are available in each case only to a small group of users. Thus it may be that a particular user requests an item from a server located many thousands of miles away even though there is an identical copy of the content item located nearby. There is presently no mechanism to allow such a locally cached copy to be accessed.

Several attempts have been made to improve access to content using caches. The possibility of locally caching items has been discussed above. Proposals such as intercache protocol (ICP) have been made and implemented in order to allow a group of caches to communicate information about the content they are holding. However this is only practicable on a localised basis amongst a small number of caches. It may be used for example on a particular site or within a particular organisation but is not scaleable across a large network such as the Internet. Similarly, the new HTCP protocol (defined in Internet Engineering Taskforce[IETF} RFC 2756) allows communication between caches but is not scaleable across a large network such as the Internet.

Another alternative is that offered by Cenus technologies in which content is advertised indiscriminately across the Internet. Whilst this allows others to learn about alternative locations for a particular content item, it is not scaleable because there is no central focus for the advertising function and therefore to be effective every user on the network must receive the Cenus advertisement to find out about alternative content locations.

Other techniques have been proposed which operate at an original server (i.e. a server containing the original version of a particular content item). For example, the so-called Akamai global load balancing technique provides typically two IP addresses in response to a request for content for a given domain. The load balancing technique can only operate within that domain and simply chooses the best server to provide the particular content item to the requester. The two IP addresses aim to provide a choice of the best two servers.

SUMMARY OF THE INVENTION

In accordance with a first aspect, the invention provides a method of indexing content in an IP-based network comprising intercepting traffic flowing in the network, extracting content identity information and associated destination location information from the traffic flow, generating a mapping from a content item identified by the extracted identity information to at least one destination location identified by the associated destination location information, and storing the mapping in a content index database which is operable to provide an instance mapping containing a list of destination locations in response to an instance request containing a content identity.

This method is described in detail below and is implemented on a content proxy which has been termed a "content discovery proxy" (CDP). A CDP may be located near a content source in which case it operates to determine where copies or replicas of particular content items are being sent and then indexes these as alternative locations for the content items. Alternatively, a CDP may be located near a cache in which case it operates to determine whether particular content items are stored in the cache and then advertises the location back to a content index database (which is termed an authoritative proxy in the description below).

Thus retrieval of content typically will involve searching for an authoritative proxy and interrogating the proxy to see if there are alternative (better) locations for the requested content item.

This method is typically implemented by a proxy which is termed herein a "content request proxy". Therefore in accordance with a second aspect of the invention there is provided a method of retrieving content in an IP-based network comprising the steps of intercepting a content request containing information related to the identity of a content item and a source specified location for the content item, sending an instance request to a content index associated with the specified source location, the instance request including the identity of the requested content, receiving an instance mapping from the content index which contains a list of instances and associated locations for the requested content, selecting the best instance of the content from the list, obtaining the requested content from the location associated with the best instance of the requested content, and returning the requested content to the requester of the content.

In accordance with a third aspect, the invention provides a proxy (termed a CDP herein) for an IP-based network comprising a data input operable to receive data from the network, a data output operable to send data to the network, an identity extractor operable to analyse data received at the data input and to extract content identity information from the data, a location extractor operable to analyse data received at the data input and to extract location information from the data, a mapping generator operable to generate a mapping from a content item identified by dentity information provided by the identity extractor, to at least one destination location identified by associated destination location information provided by the location extractor, and a content index database operable to store a mapping provided by the mapping generator and which is operable to provide an instance mapping containing a list of destination locations in response to an instance request containing a content identity.

In accordance with a fourth aspect the invention provides a proxy (termed a CRP herein) for an IP-based network comprising a data input operable to receive data from the network, a data output operable to send data to the network, a location requester operable to identify a request for a content item in data received at the data input and to send an instance request to a content index associated with the source location of the content item specified in the content request, the instance request including the identity of the requested content, and a content returner operable to receive an instance mapping containing a list of instances and associated locations for the requested content, to select the best instance of the content from the list, to obtain the requested content from the location associated with the best instance of the requested content, and to return the requested content to the requester of the content.

In other aspects, the invention provides an advertising message for advertising content in a cache which has been discovered by a content discovery proxy associated with the cache, to a content discovery proxy or an authoritative proxy associated with an origin server.

In a further aspect, the invention provides an instance request for transmission over an IP-based network, the request including a destination address and the identity of a requested content item, the destination address being a different address to the address of the location of the content item and in another aspect, the invention provides an instance mapping for transmission over an IP-based network, the instance mapping containing a list of instances and associated locations for a predetermined content item.

Preferably the step of intercepting traffic is carried out by intercepting traffic flowing into a cache or alternatively by intercepting content requests from a cache. The method may further comprise advertising content identity storage mappings which are stored in the content index by sending advertising messages to a predetermined location in the network.

Correspondingly therefore the invention may also include receiving an advertising message having information for creating a mapping or a mapping itself between a content replica and its location, and storing the mapping in a content index.

The invention also provides computer programs for operating the above methods.

Embodiments of the invention will now be described by way of example with reference to the drawings.

DETAILED DESCRIPTION OF THE EMBODIMENTS

Figure 1:
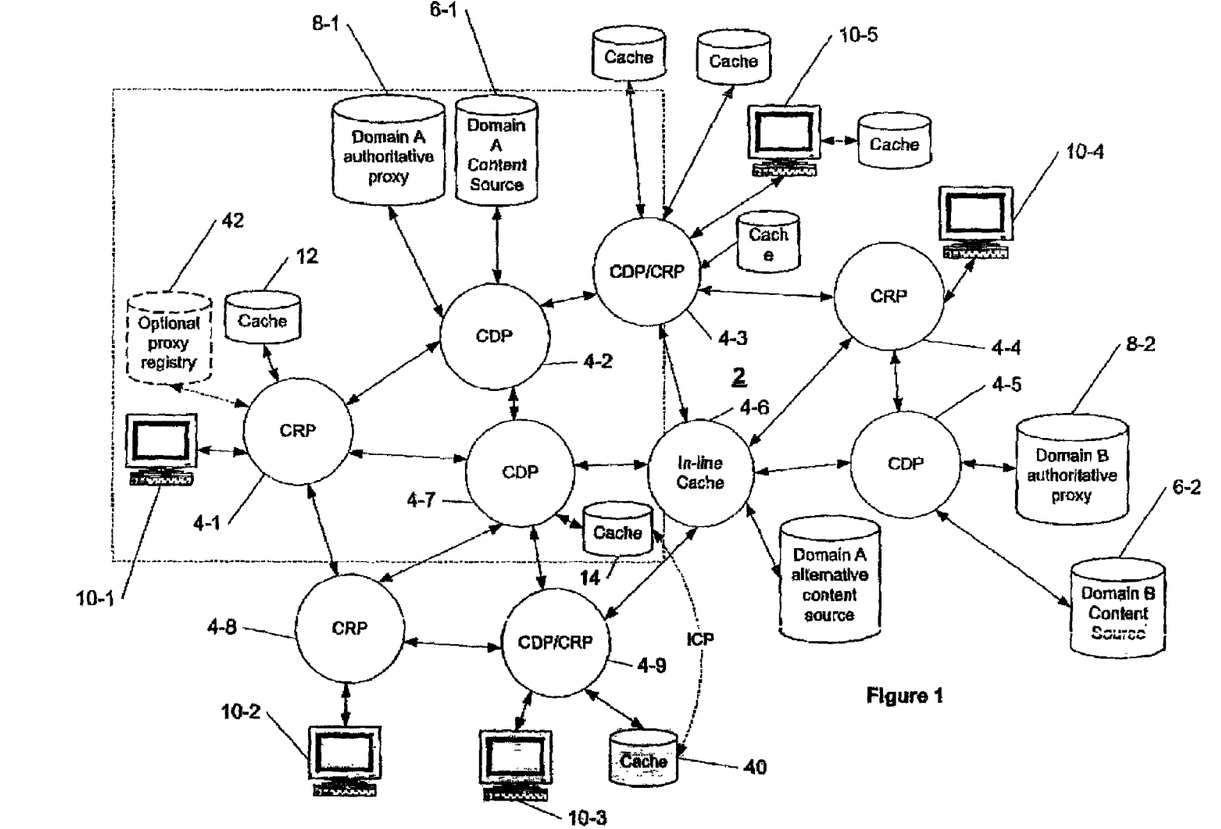
FIG. 1 is a schematic block diagram of an IP-based network incorporating the invention.

With reference to FIG. 1, a network 2 has logical functions 4-1, 4-2, 4-3, 4-4, 4-5, 4-6, 4-7, 4-8 and 4-9. These functions are typically associated with routing nodes in an Internet protocol(IP)-based network. The network may for example be a portion of the Internet, an Intranet or an Extranet. The functions send and receive data flowing in the network and may for example have data directed to them using an OSI Layer 4 switch ("a web switch") which directs particular types of packets to particular destinations.

The network has two content sources 6-1 and 6-2 which are each associated with a particular domain. Each of these domains also has an authoritative proxy 8-1 and 8-2 which is described in detail below.

The network has client workstations 10-1, 10-2, 10-3, 10-4 and 10-5 which are operable to request content from different locations on the network For example, client 10-1 may request an HTML file from domain A content source 6-1. It does this by resolving a URL of the form given above into an IP address (by sending the domain part of the URL to a domain name server (DNS), having an IP address for that domain name returned by the DNS and then issuing a request for content from a particular directory on the server referenced by the returned IP address, using a particular protocol such as HTTP.

Such a request may, for example, be routed through functions 4-1 and 4-2 before it arrives at the content source 6-1. The request from the client 10-1 also includes the clients own return IP address. Therefore, in the conventional model, the content source 6-1 extracts the content from its file store and returns it via the network 2 to the destination address contained in the original request. The outward and return routes between the client 10-1 and the content source 6-1 are not predetermined and are quite likely to be different from one another as a result of hot potato routing, different loadings and possibly failures within the network between the times of the outward and return journeys.

It is possible that the network 2 will have associated with it a cache 12 which is close to the requesting client 10-1. The content returned from domain A content source 6-1 may therefore be stored in the cache 12 so that any further request for the content by the client 10-1 will allow the locally cached copy to be returned rather than a request and returned content needing to flow through substantial parts of the network in order subsequently to obtain the same content.

Figure 2:
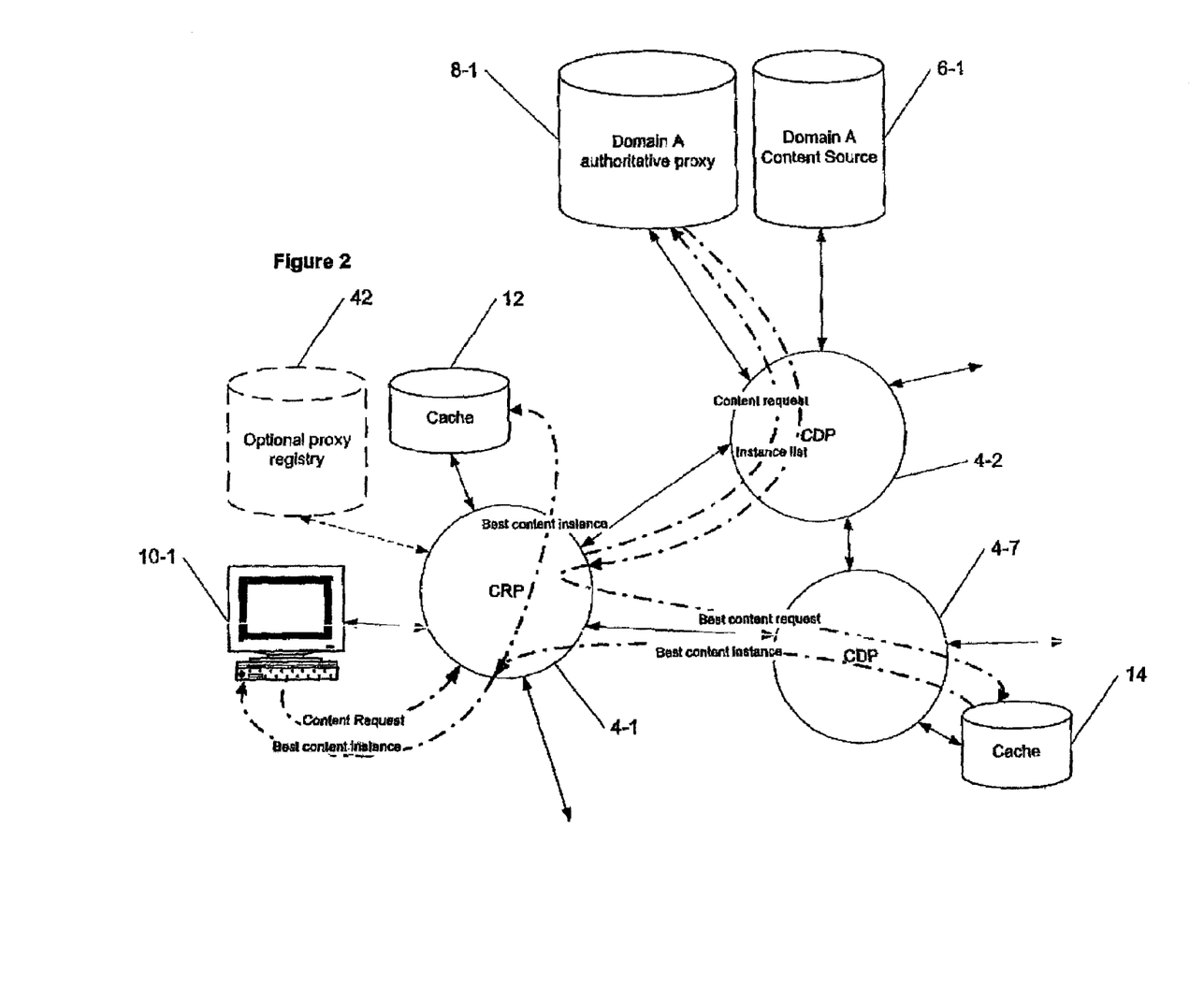
FIG. 2 is an exploded view of the portion of FIG. 1 shown in dotted outline.

With reference additionally to the enlarged portion of FIG. 1 shown in FIG. 2, an alternative and improved scenario is described which is in accordance with the invention. We assume that the workstation 10-3 has previously requested the content item which has been requested from domain A by workstation 10-1. This item is therefore (for the sake of this explanation) assumed to have been stored in a cache 14 located in the network close to workstation client 10-3.

Figure 3:
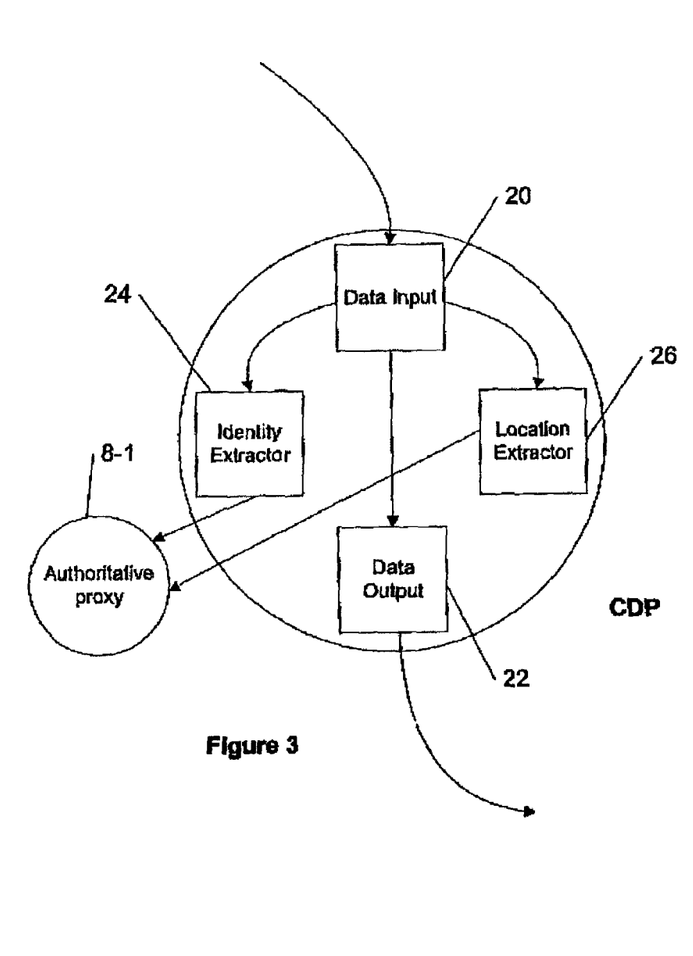
FIG. 3 is a schematic block diagram of a content discovery proxy in accordance with the invention.

It will be seen that all traffic passing to and from content source 6-1 is caused to pass through function 4-2. This function (a content discovery proxy) has special characteristics. The content discovery proxy 4-2 operates to intercept traffic flowing out of content source 6-1. With reference also to FIG. 3, the intercepted traffic passes into a data input 20 and is passed transparently through to the rest of the network via data output 22. Copies of the data are also passed into an identity extractor 24 and a location extractor 26.

The traffic is analysed to determine which contact item is being referenced within the content source 6-1 and also to which location the content item is being sent. This information is then sent to an authoritative proxy (domain A proxy 8-1 in this case) which then generates a mapping between the content item and the location for that item. In this case the location for the item is the cache 14.

The mapping is then stored in the authoritative proxy 8-1. (It will be noted that the authoritative proxy may form an integral part of the CDP or may be a separate entity).

Thus, the authoritative proxy builds up a database of locations of content items which are replicas of the content items stored on the content source 6-1.

In the example being considered, the content item which has been requested by client 10-3 and stored in the cache 14 is recorded in the authoritative proxy 8-1 and the location of the cache 14 is mapped against it.

Figure 4:
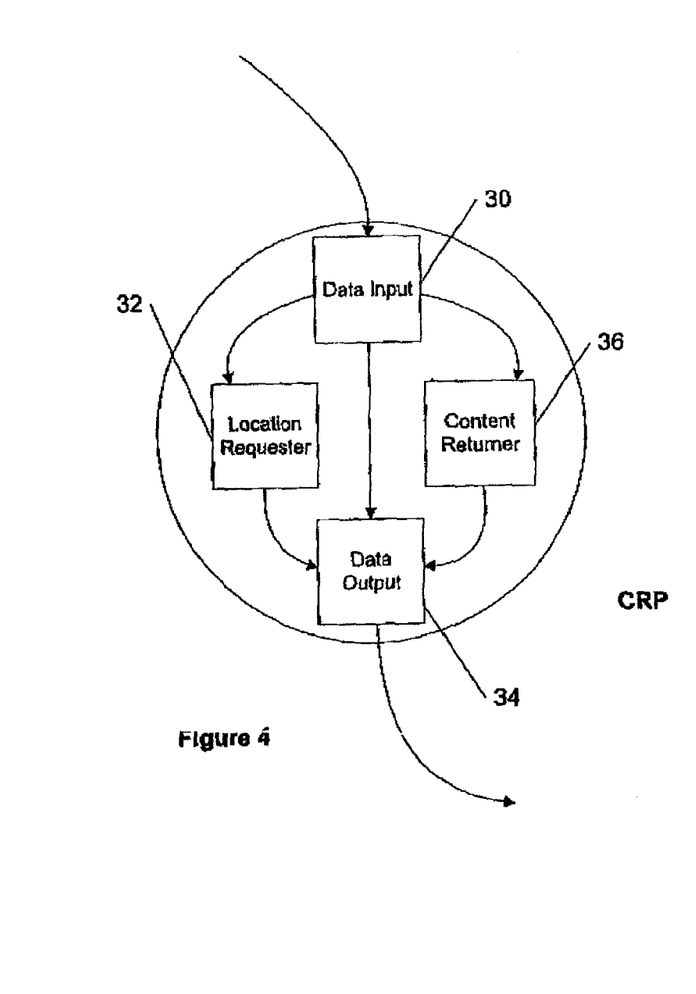
FIG. 4 is a block diagram of a content request proxy in accordance with the invention.

The use of the database of mappings will now be describe with particular reference to FIG. 2, the workstation 10-1 makes a content request which passes via content request proxy (CRP) 4-1. With reference also to FIG. 4, the content request passes into the data input 30 of the CRP 4-1. The CRP passes the data to a location requester 32.

The location requester first checks to see whether the content request (which contains a source location for the content item) has an authoritative proxy associated with it. One mechanism may, for example, be to insert a unique identifier into the domain supplied by the client 10-1 such as "registry". So that if for example the client 10-1 is requesting content from the domain a.com, the location requester may look to see if there is a domain "registry.a.com". It may determine this simply by performing a DNS lookup on the registry.a.com domain. If no authoritative proxy is available for the location of the content item, the data is passed transparently to the data output 34 and backwards compatibility is maintained. However, if an authoritative proxy is available for the domain identified in the request, the location requester sends a content request to the authoritative proxy. In this example, the content item is being requested from domain A content source 6-1 and there is an associated authoritative proxy; namely domain A authoritative proxy 8-1.

Figure 5:
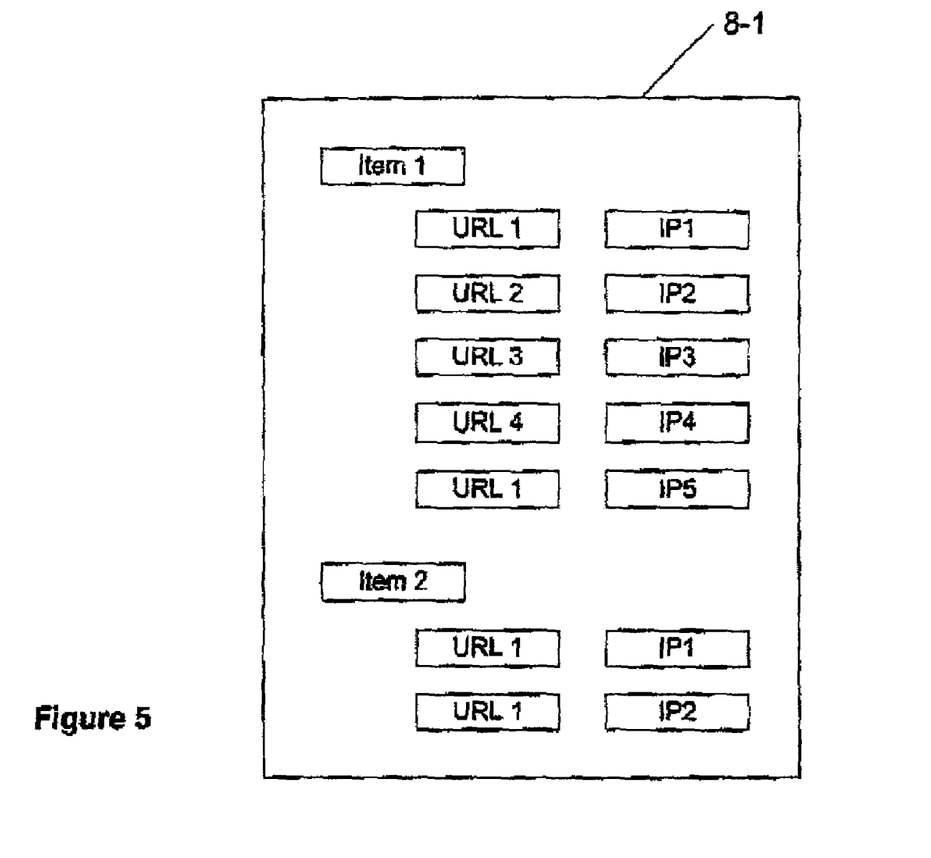
FIG. 5 is a schematic block diagram of an authoritative proxy.

With reference also to FIG. 5, it will be seen that the authoritative proxy 8-1 contains, for example, two content item mappings (item 1 and item 2) in its database and has the locations of five instances for item 1 and two instances for item 2. The database typically contains a URL for each replica and a location in the form of an IP address for the server (e.g. a cache server) holding the replica content instance referenced by the URL. The authoritative proxy on receipt of the content request interrogates its database to see if the item requested is in its mapping list. If it is, it returns a list of the URLs and server locations of all the instances of which it is aware. The authoritative proxy may also store a time-to-live for each instance. This is the known or estimated time-to-live of the instance in its location (e.g. the time-to-live in a cache server for the instance) and may be passed back to the CRP for use with the optional proxy registry feature described below, or may be used to clear expired entries from the authoritative proxy. The information about replica instances is returned to the local CRP 4-1 as an instance list.

A content returner 36 then determines which is the best instance. This determination is, for example, based on the location of the servers on which the instances are stored or on the performance of the network between these servers and the local node. Since the CRP 4-1 is close to the workstation client 10-1, it may be assumed that any network performance measurements made to find the best server which are made between the CRP 4-1 and the location of the instances will accurately reflect the performance between the instances and the nearby workstation client 10-1.

Having determined the best instance, the content returner 36 requests the item from the location of that instance and returns it via the data output 34 to the workstation client 10-1 in the form of a response to the original request,. This occurs transparently so that the client 10-1 has no knowledge of the transactions which have occurred and the actual source (cache 14) from which the content has been obtained. Thus in this example, it may be seen that the request for the content which has been replicated on cache 14 is effectively redirected so that instead of obtaining the content item from the content source 6-1, workstation client 10-1 received the content instead from cache 14 which is chosen by CRP 4-1 to be a better location from which to obtain the item.

It will be noted that generally speaking a CDP will be located near a content source or a caching location for content and that a CRP will generally be located near the part of the network in which requests for content are generated. However, in some situations, these two locations are the same and thus, for example, function 4-9 may operate as a combined CDP and CRP.

As another example of CDP operation, a CDP 4-9 may monitor the contents of a cache 40 and advertise the items which are held there, to appropriate authoritative proxies. Thus, assuming that the cache 40 holds an item which originates from domain B content source 6-2, the proxy 4-9 may detect this item entering the cache and then advertise the location to the domain B authoritative proxy for 8-2. It may do this because it knows the source location of the item because it knows from which IP address and URL the item was obtained. It may then determine whether there is an associated authoritative proxy with the domain represented by the IP address and URL and then advertise the content back to the authoritative proxy for example using the "registry" mechanism described above. In this case, it is likely that the CDP 4-5 already has made the authoritative proxy aware of the sending of the items to the cache 40. However if the CDP 4-5 were to be omitted the advertising message from the CDP/CRP 4-9 would be of value.

It will be noted that the caches 14 and 40 may communicate with one another using ICP, for example, and transfer cached content between themselves. This may be monitored by the CDPs 4-7 and/or 4-9. The duplication or transfer of cached data may then be advertised back to a relevant authoritative proxy.

As a further enhancement, the instance lists may themselves be cached. Thus an optional proxy registry 42 may be used to store instance lists which have already been obtained. These may have predetermined expiry times in the manner of a conventional content cache. Thus if the workstation client 10-1 were to request content for which an instance list had already been received, the CRP may determine this by checking the optional proxy registry 42 and using the locally cached instance list instead.

Thus this arrangement allows a content provider to allow fast access to its content via local sources of the content. It also allows the content provider to be aware of the location of replicas of the content.

It will be appreciated that any protocol may be used for the communications between the CRPs and CDPs and the authoritative proxy. However, it is fortuitous that the HTCP proposal has suitable fields for these communications even though it was not originally designed for this purpose. Thus HTCP is a suitable protocol for such communications.

In a preferred embodiment, a CDP and/or CRP would be formed as an integral part of a local cache. For example the CRP 4-1 would be integrated with the cache 12 and the combined CDP/CRP 4-9 would be integrated with the cache 40. This allows the proxy to know exactly what content is available on the cache at any one time.

Alternatively, a CDP may be provided for implementation with a legacy cache.

Typically, there are four types of caching in use. The simplest type of caching is a so-called "inline cache" such as the cache 4-6 in FIG. 1. This as its name suggests, is inserted inline and typically operates transparently by receiving requests for content, checking whether it already holds the content and if not, making a request for the content from the content source. The cache caches content according to its own internal policies and passes the content (obtained either from the source or its own cached storage) transparently through to the next function or node in the network.

Alternatively, the cache may not be "inline" but may be used with a mechanism which directs content requests and data into the cache. For example, a client may be configured with a web proxy address which is actually the address of the cache. Thus any content request made by the client will always be directed to the cache and the cache may then meet the request from its own stored content or request the content from the source location and pass it back to the client. Another example (discussed briefly above) is an OSI layer 4 switch which looks for particular types of packets and directs them to a cache server. A further option is to associate a cache with a "web cache control protocol" (WCCP)-enabled router. WCCP allows a router to communicate with a cache in a way that allows the router and the cache to co-operate to cache traffic flowing through the router according to pre-determined policies.

In the case of the latter three examples of caches which are non-inline, the CDP will typically be located near the cache in the network. The mechanisms described above either monitor traffic flowing into the cache or communicate directly with the cache using a protocol such as ICP or HTCP, which then allows the CDP to discover cached content.

In the case of the inline cache, it may be possible to co-locate a CDP with the cache and to communicate using a protocol such as ICP or HTCP.

An alternative approach for inline caches is to use a CDP located at the source location which looks for content being directed to a cache. It may, for example, recognise content going to a cache because the HTTP protocol contains particular text strings. Thus a CDP located at the source location can inform the local authoritative proxy also located at the source location that content has just been passed to what appears to be a cache.

As a further enhancement, any of the functions above such as an authoritative proxy, a CDP or a CRP may pro-actively create replicas on the network and record them in the authoritative proxy. For example, it may be determined that particular files or directories are likely to be used heavily at particular locations. Thus a cache local to those locations may be provisioned in advance with replica instances.

The CDP ideally should determine the lifetime of items stored on the cache in order to avoid directing CRPs to the cache only to have the CRPs find that the item does not exist on the cache any more. A CDP may therefore monitor how frequently the cache requests a particular item in order to determine how quickly the items are expired or it may for example be able to "talk" to the cache for example using HTCP. The CDP may also use the expiry time contained in the HTTP standard (or equivalents) as a backstop expiry time for content. The CDP may also keep statistics about failed requests to retrieve items from the cache and to advertise the absence of a particular content item in its cache to the relevant authoritative proxy.

In another preferred embodiment, the CRP may form part of a web proxy or may for example be the recipient of particular protocols (for example HTTP requests) as a result of a web switch which directs traffic for particular transport protocols to the CRP.

It will also be noted that if the CRP is located away from a particular workstation, it is readily scaleable to several local users. Furthermore, the CRP may perform a security role. It may, for example, be used to hide the actual locations of content items from the client. The client may make a request which is effectively translated by the CRP in conjunction with the authoritative proxy, into a real address for a particular content item. This may be used to prevent direct access to high security items without first being authorised by the CRP.

Figure 6:
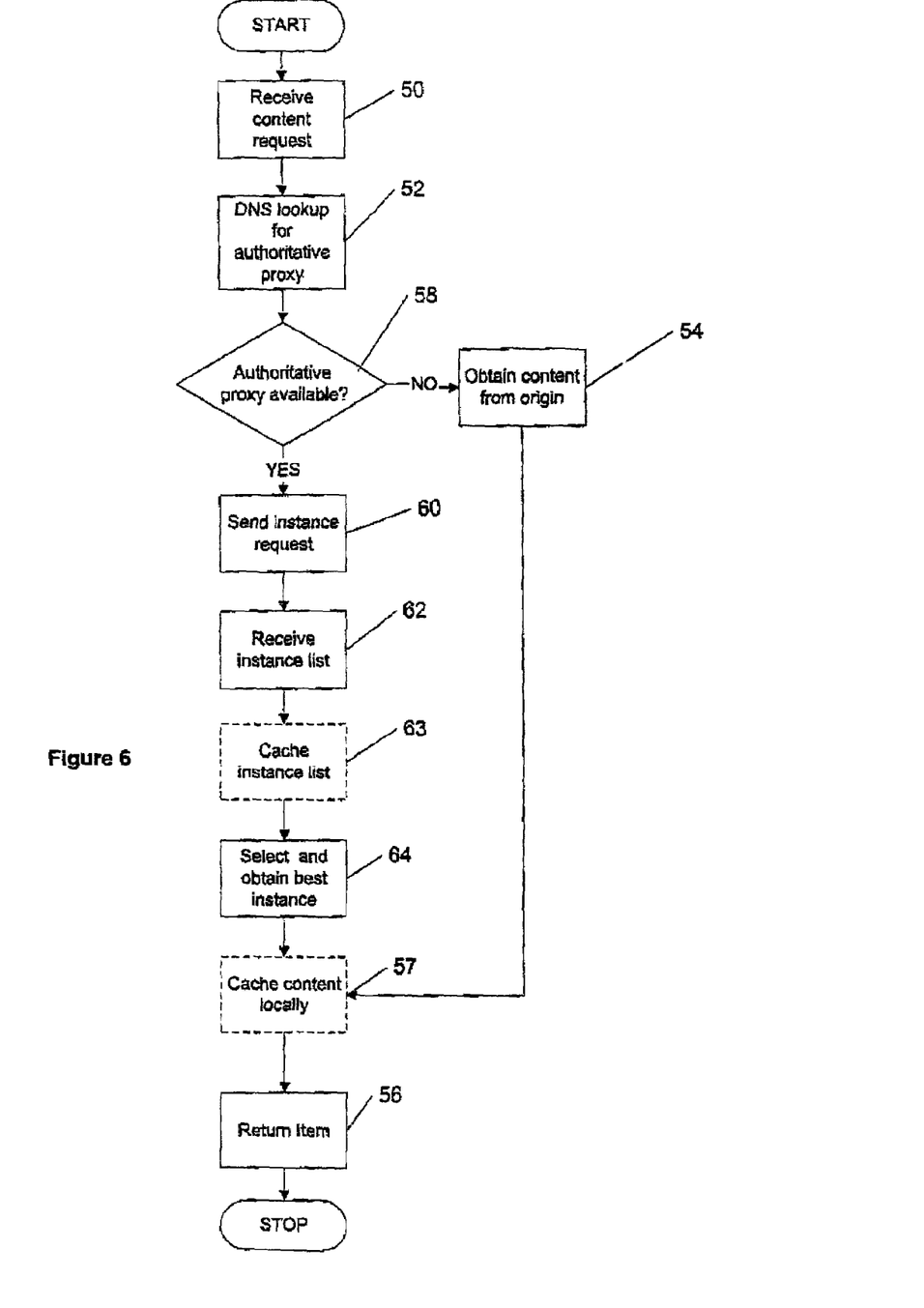
FIG. 6 is a flow chart showing the steps carried out by a CRP.

With reference to FIG. 6, the steps undertaken by the CRP are in general terms, as follows.

The CRP receives a content request from a client (step 50). The CRP then performs a DNS look up (step 52) to determine if an authoritative proxy is available for the domain associated with the content in the content request.

If an authoritative proxy is not available the content is obtained from the origin specified in the content request (step 54), the item is returned to the requester (step 56) and may be cached (step 57)

If an authoritative proxy is available (step 58), an instance request is sent to the authoritative proxy (step 60). The CRP then receives an instance list (step 62), which may be cached (step 63), selects the best instance (step 64) obtains the best instance of the item from the located associated with that instance (which is returned in the instance list) and then returns the item (step 56). The item may also be cached (step 57).

Figure 7:
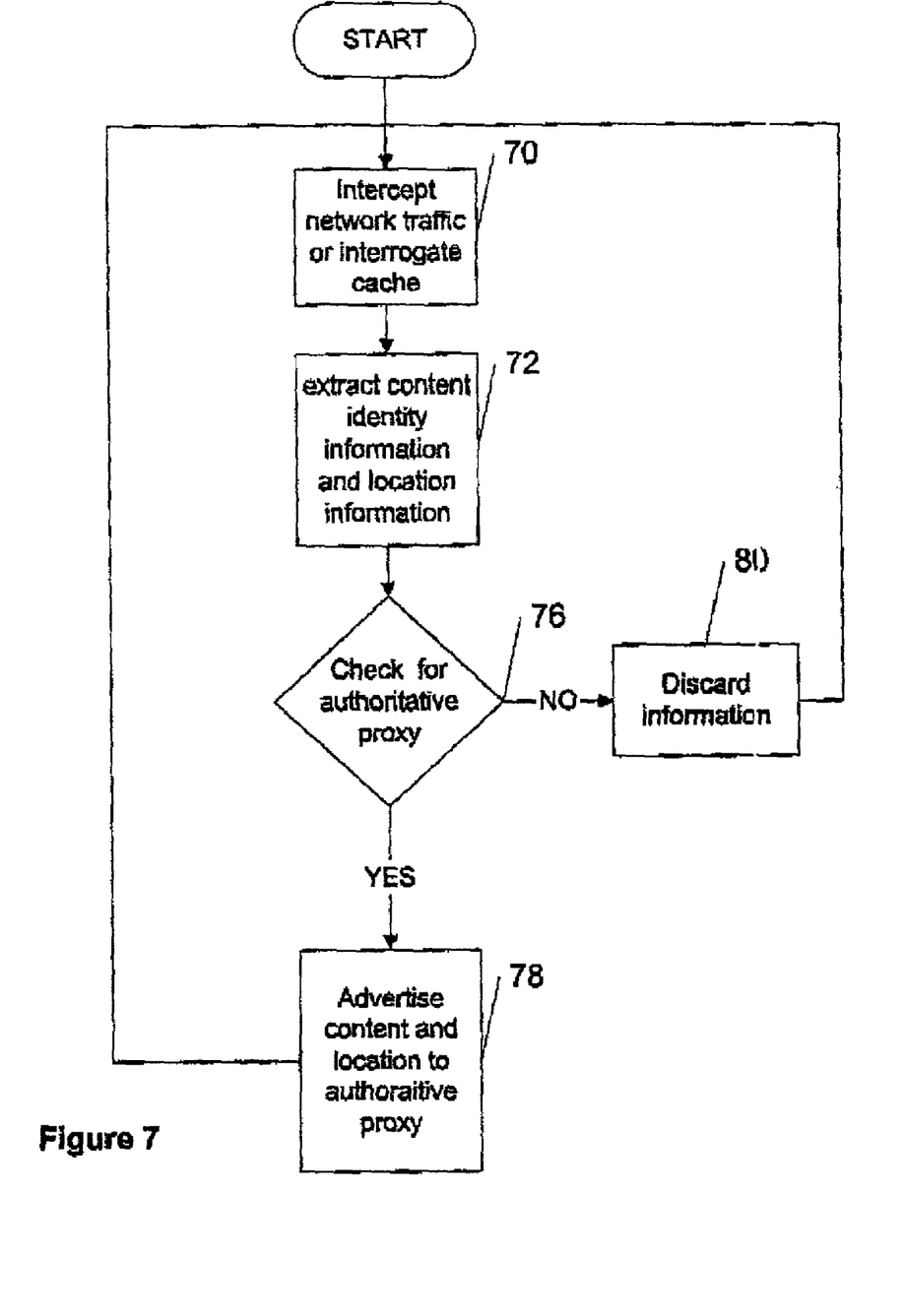
FIG. 7 is a flow chart showing the steps carried out by a CDP.

With reference to FIG. 7, the steps carried out by a content discovery proxy are set out in broad terms.

In step 70, the CDP intercepts network, for example, traffic flowing into inline cache, or interrogates a cache, for example, using HTCP.

In step 72, in the case of intercepted traffic the CDP extracts content identity information and location information from the traffic. In the case of communications directly with a cache, the location of the cache is known and the content identity may extracted from the cache.

The CDP then checks to see whether there is an authoritative proxy associated with the domain forming the source location of the content (step 76) and if an authoritative proxy is found the CDP passes the content identity and location information to the authoritative proxy (step 78). Alternatively if no authoritative proxy is found, the information is discarded (step 80) and the loop is restarted in order to search for additional content replicas.

The invention described above described above provides a readily scaleable arrangement for improving access to content. The invention is backwards compatible with content servers which do not have authoritative proxies and may be implemented with "legacy" hardware platforms. A typical roll out scenario might be the provision of CDPs and authoritative proxies at selected high traffic content sources and the provision of CRPs by users wishing to take advantage of authoritative proxies. By also providing CDP functionality within the CRP, the mappings contained in the authoritative proxy may be made more comprehensive.

What is claimed is:

1. A computer implemented method of indexing location of content cached within an IP-based network comprising:
   (a) intercepting data traffic flowing from a source node to a destination node in the network, the data traffic including content to be cached at the destination node,
   (b) extracting identity information for the content and associated destination location information for the destination node where the content in the data traffic is to be cached from the data traffic,
   (c) generating a mapping from the content identified by the extracted identity information to the destination node identified by the associated destination location information,
   (d) storing the mapping in a content index database, wherein the database provides an instance mapping containing a list of destination nodes at which the content has been cached, the instance mapping being provided in response to an instance request containing the identity information for the content, and
   (e) advertising the extracted content identities to which mappings are stored in the content index by sending advertising messages to a predetermined location in the network.

2. A method according to claim 1, wherein the step of intercepting data traffic is carried out by intercepting data traffic flowing into a cache.

3. A method according to claim 2, wherein the method further comprises recording the time of data traffic flows into the cache which are related to a particular content item and calculating the time period between a first flow of the content item into the cache and a subsequent flow of the content item into the cache thereby to assess how long content items are held in the cache before expire and deleting the mapping relating to that particular content item when the said particular content item is judged to have expired in the cache.

4. A method according to claim 1, wherein the step of intercepting data traffic is carried out by intercepting data traffic flowing out of an original content source node.

5. A method according to claim 4, wherein the method further comprises receiving an advertising message which advertises a mapping generated elsewhere on the network and said message is related to content items stored in the original content source node, and augmenting the content index using information contained in the advertising message.

6. A method according to claim 1 wherein the step of intercepting data traffic is carded out by intercepting content requests issued by a cache, and wherein the method further comprises advertising the content identities for which mappings are stored in the content index by sending advertising messages to a predetermined location in the network.

7. A proxy for an IP-based network comprising:
   (a) a processor,
   (b) a data input to receive traffic data transmitted from a source node to a destination node from the network, the traffic data including content to be cached at the destination location, wherein the data traffic flowing form the source node to the destination node is intercepted.
   (c) a data output to send data including the content to the network,
   (d) an identity extractor to analyze data received at the data input and to extract, from the data, identity information for the content,
   (e) a location extractor to analyze data received at the data input and to extract, from the data, location information for the destination node where the content in the data is to be cached,
   (f) a mapping generator to generate a mapping from a content item identified by identity information provided by the identity extractor, to at least one destination node where the content is to be cached, the at least one destination node identified by associated destination location information provided by the location extractor,
   (g) a content index database to store a mapping provided by the mapping generator and to provide an instance mapping containing a list of destination nodes at which the content has been cached, the instance mapping being provided in response to an instance request containing an identity of the content item, and
   (h) an advertising message for transmission over the network, the message advertising a replica content item and the location of said replica content item.

8. A computer program, stored on computer readable medium, which, when executed by an apparatus, causes the apparatus to index content in an IP-based network by:
   (a) intercepting data traffic flowing from a source node to a destination node in the network, the data traffic including content to be cached at the destination node,
   (b) extracting identity information for the content and associated destination location information for the destination node where the content in the data traffic is to be cached from the data traffic flow,
   (c) generating a mapping from the content identified by the extracted identity information to the destination node identified by the associated destination location information,
   (d) storing the mapping in a content index database which provides an instance mapping containing a list of destination nodes at which the content has been cached, the instance mapping being provided in response to an instance request containing the identity of the content, and
   (e) advertising the extracted content identities to which mappings are stored in the content index by sending advertising messages to a predetermined location in the network.

* * * * *